W. S. SMITH.
HULL EXTRACTOR FOR COTTON.
APPLICATION FILED MAY 20, 1916.

1,257,543.

Patented Feb. 26, 1918.
2 SHEETS—SHEET 1.

W. S. Smith, Inventor

By Lancaster and Allwine
His Attorneys

W. S. SMITH.
HULL EXTRACTOR FOR COTTON.
APPLICATION FILED MAY 20, 1916.
1,257,543.
Patented Feb. 26, 1918.
2 SHEETS—SHEET 2.
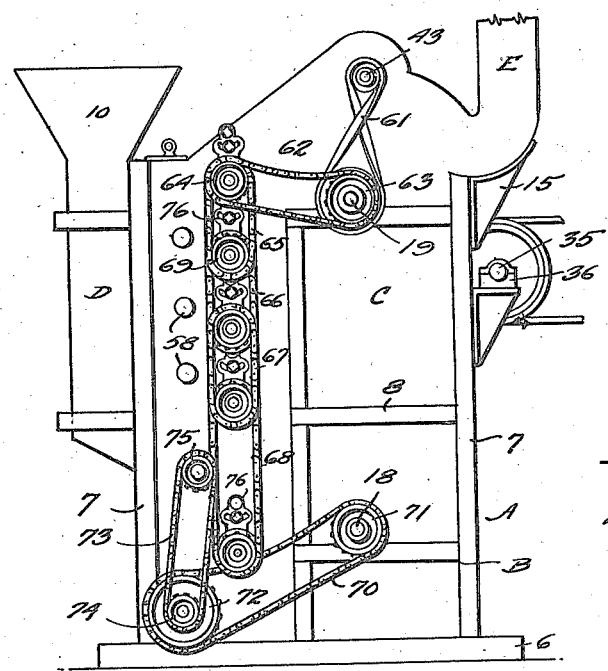
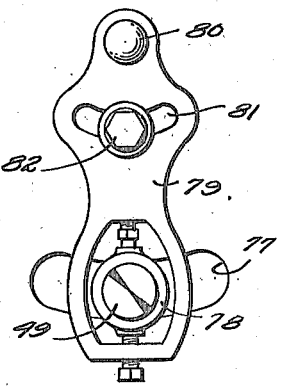
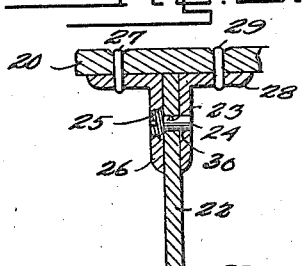
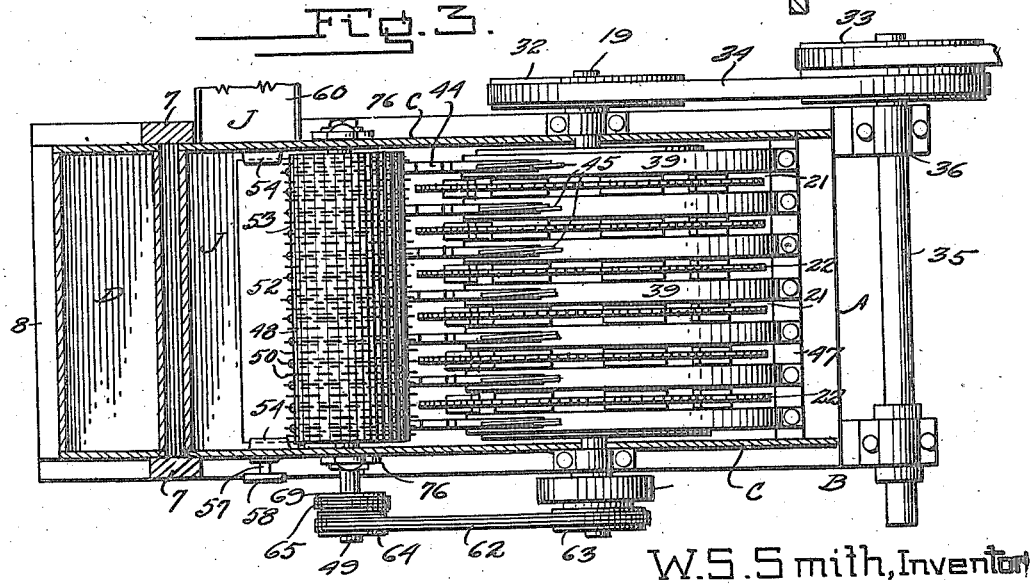
W. S. Smith, Inventor
By Lancaster and Allwine
His Attorneys

UNITED STATES PATENT OFFICE.

WILLIAM S. SMITH, OF TISHOMINGO, OKLAHOMA, ASSIGNOR OF ONE-EIGHTH TO C. B. BURROWS AND ONE-EIGHTH TO GEORGE W. DUDLEY, BOTH OF TISHOMINGO, OKLAHOMA.

HULL-EXTRACTOR FOR COTTON.

1,257,543.

Specification of Letters Patent.   Patented Feb. 26, 1918.

Application filed May 20, 1916.   Serial No. 98,738.

*To all whom it may concern:*

I, WILLIAM S. SMITH, a citizen of the United States, and resident of Tishomingo, in the county of Johnson and State of Oklahoma, have invented a certain new and useful Improvement in Hull-Extractors for Cotton, of which the following is a specification.

My present invention relates to a machine for extracting the hulls from cotton, embodying an endless carrier for saws, and extracting and picking mechanism coöperating with said saws, to separate the hulls from that cotton which has been caught up by the teeth of the saws.

The principal object of my invention is to provide an improved machine which will thoroughly separate the cotton from the hulls by subjecting the mass to the action of a plurality of sets of saws and pickers, whereby the separation is more effectively accomplished, with a minimum of waste.

Other objects of my invention are to provide a machine of the character described which is compact, and easily maintained in good repair; and, a machine embodying parts which are adjustable so that it may be arranged to act upon the particular work at hand for effectively accomplishing the separation.

Further objects of my invention will appear in the following detailed description, taken in connection with the accompanying drawings, forming a part of this specification, and in which drawings:

Fig. 2 is a side elevation of said machine, on a reduced scale.

Fig. 3 is a view partly in plan and partly in horizontal section, certain elements having been removed to disclose details.

Fig. 4 is an enlarged elevation of an adjustable hanger for picker drums.

Fig. 5 is a detail sectional view through a portion of a flexible carrier, a saw, and its mounting in connection with said carrier.

Figure 1:
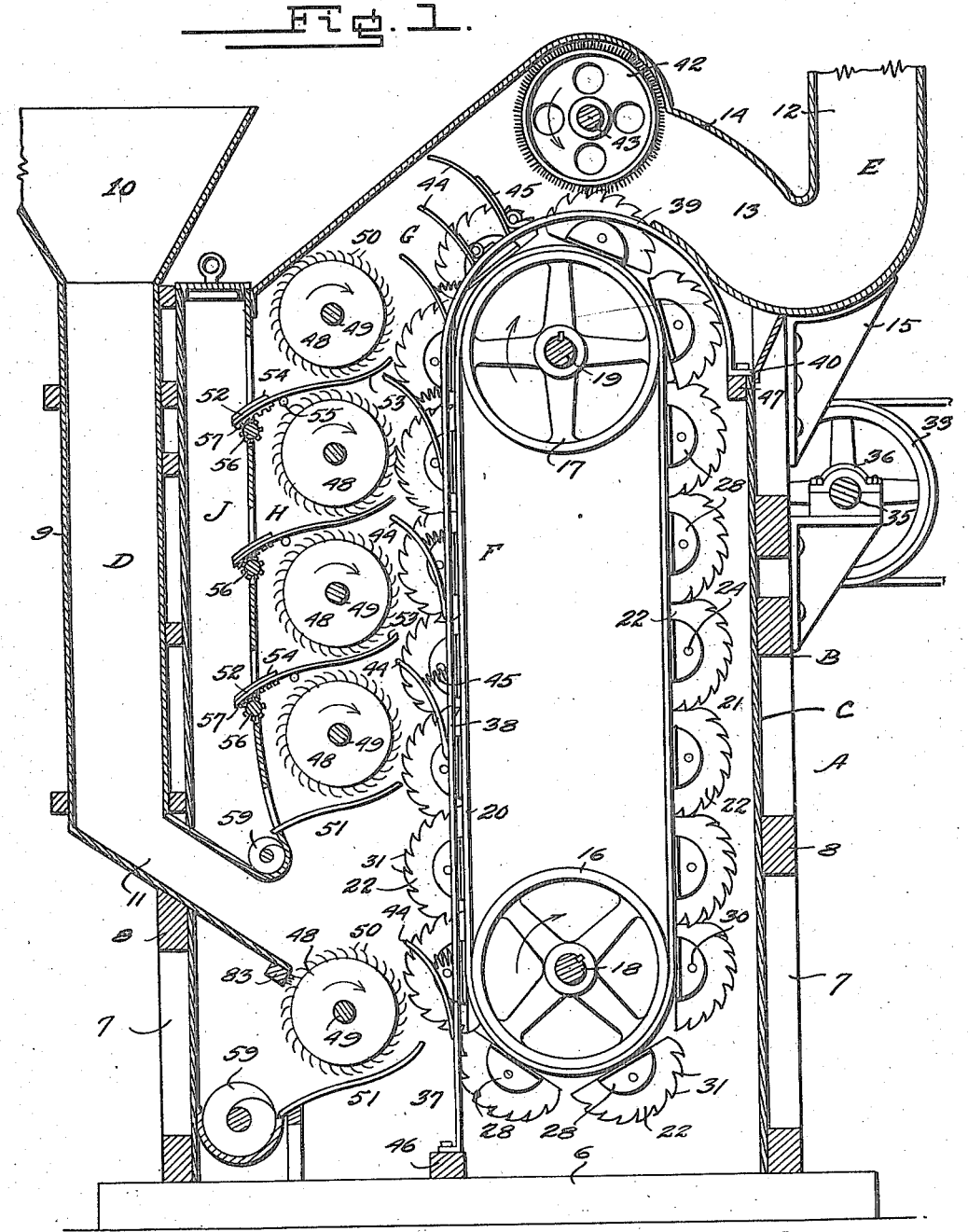
Figure 1 is a view partly in elevation and partly in vertical section through a machine constructed according to my invention.

In the drawings, where similar characters refer to similar parts throughout the several views, A designates the suitable casing including frame B and walls C; D an inlet to the casing A for the mass to be acted upon; E an outlet for cotton from said casing; F saw mechanism; G extracting mechanism; H picking mechanism; and J an outlet for waste product.

Referring first to the casing A, it may be built up of any suitable material and in the example shown, the frame B comprises a base 6, vertical members 7, and cross members 8 to which the walls C are secured. The inlet D may comprise a vertical shaft 9, at the upper portion of which a suitable hopper 10 is provided, the lower portion of shaft 9 leading to a chute 11, which extends through the wall C of the casing A, with its egress end at the lower portion of said casing. The outlet E, in the example shown, includes the vertical shaft 12, leading from an arcuate shaft 13, the upper wall 14 of which forms the top of the casing. The shafts 12 and 13 may be supported by a suitable bracket 15 secured to the uprights 7.

Referring now to the saw mechanism F, it comprises two pulleys 16 and 17, the latter arranged above the former, said pulleys keyed to shafts 18 and 19 respectively; an endless carrier or belt 20 trained about the pulleys 16 and 17; and, a plurality of sets of saws 21, the saws 22 of each set arranged in succeeding relation longitudinally of the belt 20 and detachably secured thereto in any suitable manner. It is preferred to form the saws 22 arcuate and they may be provided with a transverse perforation 23 to receive the stem 24 of a set screw 25, said set screw in threaded engagement with a bracket 26 secured to the belt 20 as by brad 27. A second bracket 28 is disposed at the other side of saw 22, said bracket secured to the belt 20, as by brad 29, and provided with a perforation 30 receiving the end portion of the stem 24. Thus by removing the set screw 25, a broken saw may be readily replaced, the new saw being held rigid with belt 20 by the extension of stem 24 through its perforation 23. Assuming that the pulleys 16 and 17 are rotated in a direction indicated by the arrow, the teeth 31 of saws 22 are disposed extending in a direction clearly shown in Fig. 1, and cotton in hulls which is passed through inlet D is caught up by teeth 31 and carried in a vertical direction laterally of one of the runs of belt 20. Movement may be imparted to shaft 19 through pulleys 32 and 33, over which belt 34 is trained, the pulley 32 being keyed to shaft 19, while the pulley 33 is keyed to a shaft 35 supported by bearings 36 secured to uprights 7.

As to mechanism G, it is for the purpose of forcing the hulls away from saw teeth 31, and may comprise a plurality of elongated supports 37, each support including an elongated main body portion 38 extending longitudinally of and in close proximity to the run of belt 20 traveling upwardly from pulley 16 to pulley 17; and an arcuate portion 39 the end 40 of which is spaced a greater distance from belt 20 than at its juncture with main body portion 38. By this construction such cotton as is caught up by the saw teeth 31 is moved toward the crown of the arcuate saws 22, as they reach the ingress of shaft 13, and in close proximity to which is provided a brush 42 revolubly mounted, as by shaft 43, and movable in the direction indicated by arrow. This brush serves to force the cotton from teeth 31 of the saws and dispose it in the outlet of the machine. This outlet may be connected with a suitable suction device (not shown in the drawings) to facilitate the removal of the cotton from the machine. A plurality of arcuate yieldable arms are arranged in spaced relation on each support 37 laterally of the saws 22, the said arms 44, beginning adjacent the start of the run of belt 20 being relatively shorter than the succeeding arms. In the example shown, these arms may be rigidly secured to supports 37, and springs 45 may be interposed between the arms and supports to normally dispose them in the desired position. The supports 37, together with the arms 44 carried thereby, are arranged so that there is one support 37 to each side of the saws. Thus, as the cotton is fed into the machine, and the teeth 31 of the saws engage the cotton, it, together with the hulls are moved in a vertical direction, the hulls engaging the arms 44 and being forced away from the saws during operation of the machine. It is to be observed that the end portions of certain of the arms 44 being nearer the supports 37, they permit some of the hulls to be carried upwardly without being entirely dislodged from the cotton. If desired, the portions 37 may also be yieldable to some extent and in the example shown, they are detachably secured to cross members 46 and 47 supported by the frame B.

As to mechanism H, it comprises a plurality of revoluble drums 48, mounted on shaft 49; teeth 50 on the peripheries of these drums; and, yieldable chutes 51, one chute below each drum 48. These drums are arranged one above another with their peripheries and in close proximity to the saws 22, laterally of one of the runs of belt 20. The teeth 50 are preferably yieldable and in the example shown, recede from the peripheries of the drums in a direction counter to rotation. Each chute may be formed of fabricated spring metal and include a main body portion 52, with stems 53 extending beneath the drums 48 and into close proximity to the saws 22. Certain of the chutes may be adjustably mounted, as by engaging a superposed guide 54 and beneath which is provided an idler 55 at each side of the machine, a sprocket 56 and rack 57 at each side of the machine, the racks 57 being secured to the under side of main body portion 52. The pinions 56 may be connected by a shaft 57 extending through the wall C of the casing and to which shaft is secured a hand wheel 58. Thus, by rotating the hand wheel, the chute may be moved toward or from the saws 22, as desired. These chutes lead to the outlet J for the hulls, spiral conveyers 59 being provided to move the hulls finding their way through the outlet, transversely of the machine to a suitable chute 60, clearly shown in Fig. 3 of the drawings.

Movement of shaft 19 may be imparted to shaft 43 of brush 42 as by belt 61, and the shafts 49 of drums 48 may be rotated as by chains 62 trained about sprockets 63 and 64, on shaft 19 and 49 respectively, the movement of one shaft 49 being imparted to the other shafts of the drums as by chains 65 to 68, more clearly shown in Fig. 2, trained about sprockets 69 so that all of the drums rotate in a uniform direction, as indicated by arrows in Fig. 1. The spiral conveyers 59 may also be rotated by means of chains and sprockets, in the example shown, a chain 70 being trained about sprockets 71 and 72, the former on shaft 18, and the latter rigid with the lowermost conveyer 59. Movement may be imparted to the uppermost conveyer as through chain 73 trained about sprockets 74 and 75 rigid with the two conveyers.

I prefer to adjustably mount the drums 48, and in the example shown, the shaft 49 of each drum may be pendantly supported by hangers 76, shown in detail, in Fig. 4. Each shaft 49 extends through an arcuate opening 77 in the walls of the casing A, the end portions of the shaft being received by bearings 78 adjustable in a frame 79, said frame 79 being pivoted to the wall of the casing as at 80 and provided with an arcuate slot 81 through which extends a bolt 82 having screwthreaded engagement with walls C. Thus, by releasing bolt 82, the drum 48 may be swung toward or from the saws 22, and by turning the said bolt tight, the drum will be retained in an adjusted position.

At the egress of chute 11, I provide one of the drums 48 spaced relatively greater than the spacing of the drums thereabove. A brush 83 may be provided to engage the teeth 80 of said drums preventing the cotton from dropping directly upon the lowermost chute 51.

The operation of the machine is as follows:

The mass of cotton in hulls is introduced into the machine through inlet D, whereupon it engages the lowermost drum 48, the teeth of which drum move the mass toward the lowermost saws of the sets 21 adjacent the lower portion of the upwardly moving run of belt 20. The teeth 31 of said saws engaging the cotton carry the mass upwardly, the picking mechanism serving to dislodge the hulls from the cotton. As the hulls engage arms 44, they are forced from the teeth of the saws. The teeth 50 of the drums being yieldable, they serve to crush the empty hulls which find their way to chute 51 and ultimately to the egress of outlet J. Such hulls as contain cotton and which are forced from engagement with the saws by arms 44, are pressed toward the saw teeth by the next succeeding drum and so on, until the cotton is separated from the hulls. It is to be observed that the hulls are acted upon in succeeding relation as they travel toward the upper portion of the machine. As the saws approach the arcuate portions 39 of the supports 37, the cotton is forced toward the brush 42, which throws the cotton into outlet E.

Changes in details may be made without departing from the spirit or scope of my invention; but,

I claim:

1. A hull extractor for cotton comprising in combination, an endless carrier, a plurality of sets of saws arranged longitudinally of said carrier, means for forcing the hulls from close proximity to the teeth of said saws, and pickers for forcing the hulls containing cotton toward said saws.

2. A hull extractor for cotton comprising in combination, a plurality of sets of saws, each set comprising a plurality of saws arranged in succeeding relation, said sets of saws bodily movable in parallel planes, means for forcing the hulls from close proximity to the teeth of said saws, and pickers for forcing the hulls containing cotton toward said saws.

3. A hull extractor for cotton comprising in combination, a plurality of sets of saws, each set comprising a plurality of arcuate saws arranged in succeeding relation, said sets of saws bodily movable in parallel planes, means for forcing the hulls from close proximity to the teeth of said saws, and pickers for forcing the hulls containing cotton toward said saws.

4. A hull extractor for cotton comprising in combination, two pulleys arranged in spaced relation one above the other, a belt around said pulleys, a plurality of sets of saws arranged longitudinally of said belt, means for forcing the hulls from close proximity to the teeth of said saws, and pickers for forcing the hulls containing cotton toward said saws.

5. A hull extractor for cotton comprising in combination, two pulleys arranged in spaced relation one above the other, a belt around said pulleys, a plurality of sets of arcuate saws arranged longitudinally of said belt, means for forcing the hulls from close proximity to the teeth of said saws, and pickers for forcing the hulls containing cotton toward said saws.

6. A hull extractor for cotton comprising in combination, two pulleys arranged in spaced relation, a belt about said pulleys, a plurality of sets of saws, means for detachably securing the saws of said sets to said belt longitudinally thereof, means for forcing the hulls from close proximity to the teeth of said saws, and pickers for forcing the hulls containing cotton toward said saws.

7. In a hull extractor for cotton, the combination of two pulleys arranged in spaced relation, a belt about said pulleys, a set of saws arranged longitudinally of and carried by said belt, two elongated supports, one to each side of said saws, each support including a main body portion extending longitudinally of and in close proximity to a run of said belt, and an arcuate portion about the curved portion of said belt at one of said pulleys, said arcuate portion of said support having its end portion spaced a greater distance from said belt than at its juncture with said main body portion, and means carried by said support extending laterally of said jaws to force the hulls away from the teeth thereof.

8. In a hull extractor for cotton, the combination of two pulleys arranged in spaced relation, a belt about said pulleys arranged in spaced relation, a set of saws arranged longitudinally of and carried by said belt, two elongated supports, one to each side of said saws, each support including a main body portion extending longitudinally of and in close proximity to a run of said belt, and an arcuate portion about the curved portion of said belt at one of the pulleys, said arcuate portion of said support having its end portion spaced a greater distance from said belt than at its juncture with said main body portion, and a plurality of arcuate arms in spaced relation carried by said supports and extending laterally of said saws.

9. In a hull extractor for cotton, the combination of two pulleys arranged in spaced relation, a belt about said pulleys, a set of saws arranged longitudinally of and carried by said belt, two elongated supports, one to each side of said saws, each support including a main body portion extending longitudinally of and in close proximity to a run of said belt, and an arcuate portion about the curved portion of said support having its end portion spaced a greater distance from said belt than at its juncture with said main body portion, and a plurality of yieldable arcuate arms in spaced relation carried by said supports and extending laterally of said saws, the said arms beginning adjacent the start of the run of said belt being relatively shorter than the succeeding arms.

10. In a hull extractor for cotton, the combination of two pulleys arranged in spaced relation, a belt about said pulleys, a set of saws arranged longitudinally of and carried by said belt, two elongated supports, one at each side of said saws, and a plurality of arcuate arms in spaced relation carried by said supports and extending laterally of said saws, the said arms beginning adjacent a start of a run of said belt being relatively shorter than the succeeding arms.

11. A hull extractor for cotton comprising in combination, saws, a plurality of revoluble drums arranged one above another with their peripheries facing and in close proximity to said saws, said drums bodily movable toward and from said saws, teeth on said drums, and yieldable chutes below said drums inclined downwardly from said saws.

12. A hull extractor for cotton comprising in combination, saws, a plurality of revoluble drums arranged one above the other with their peripheries facing and in close proximity to said saws, teeth on said drums, and yieldable chutes below said drums inclined downwardly from said saws, and adjustable toward or from the latter.

13. A hull extractor for cotton comprising in combination, saws, a plurality of revoluble drums arranged one above another with their peripheries facing and in close proximity to said saws, said drums bodily movable toward and from said saws, teeth on said drums, and yieldable chutes below said drums inclined downwardly from said saws, and adjustable toward or from the latter.

14. In a hull extractor for cotton, the combination of two pulleys arranged in spaced relation, a belt about said pulleys, a set of saws arranged longitudinally of and carried by said belt, and two elongated supports, one to each side of said saws, said supports each including a main body portion extending longitudinally of and in close proximity to a run of said belt, and an arcuate portion about the curved portion of said belt at one of said pulleys, said arcuate portion of said support having its end portion spaced a greater distance from said belt than at its juncture with said main body portion.

15. In a hull extractor for cotton, the combination of two pulleys arranged in spaced relation, a belt about said pulleys, a set of saws arranged longitudinally of and carried by said belt, two elongated supports, one at each side of said saws, each support including a main body portion extending longitudinally of and in close proximity to a run of said belt, and an arcuate portion about said curved portion of said belt at one end of said pulleys, said arcuate portion of said support having its end portion spaced a greater distance from said belt than at its juncture with said main body portion, and a brush adjacent the said arcuate portion of said supports acting upon said saws.

WILLIAM S. SMITH.